(12) United States Patent
Matsuura et al.

(10) Patent No.: US 9,187,134 B2
(45) Date of Patent: Nov. 17, 2015

(54) VEHICLE BODY SIDE STRUCTURE

(71) Applicant: HONDA MOTOR CO., LTD., Tokyo (JP)

(72) Inventors: Hirokazu Matsuura, Wako (JP); Takashi Yamada, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 14/360,164

(22) PCT Filed: Oct. 1, 2012

(86) PCT No.: PCT/JP2012/075329
§ 371 (c)(1),
(2) Date: May 22, 2014

(87) PCT Pub. No.: WO2013/077084
PCT Pub. Date: May 30, 2013

(65) Prior Publication Data
US 2014/0333093 A1    Nov. 13, 2014

(30) Foreign Application Priority Data

Nov. 25, 2011  (JP) .................................. 2011-258270

(51) Int. Cl.
*B62D 25/00* (2006.01)
*B62D 25/04* (2006.01)
(Continued)

(52) U.S. Cl.
CPC ................ *B62D 25/04* (2013.01); *B62D 25/02* (2013.01); *B62D 25/025* (2013.01); *B62D 25/20* (2013.01)

(58) Field of Classification Search
CPC .... B60N 2/4235; B60N 2/42736; B60N 2/01; B60N 2/427; B60N 2/42709; B60N 2/68; B60N 3/063; B60K 1/04; B60K 2001/0438; B60K 15/067; B60K 15/07; B60K 2015/0634
USPC ............... 296/187.12, 146.6, 187.03, 187.08, 296/203.03, 209, 204–205; 180/65.21, 735; 293/122, 128; 29/897.2; 49/502, 449
See application file for complete search history.

(56) References Cited

U.S. PATENT DOCUMENTS 5,388,885 A * 2/1995 Warren .................... 296/203.03
8,690,218 B2 * 4/2014 Kuhl et al. ....................... 296/30
(Continued)

FOREIGN PATENT DOCUMENTS

JP    S59-63080    4/1984
JP    4-13475    2/1992
(Continued)

OTHER PUBLICATIONS

Japanese Office Action with partial English translation dated Feb. 10, 2015, 5 pages.

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A vehicle body side structure, which enables the rigidity of a bottom section to be ensured through the reinforcement of a bottom section of a pillar. The vehicle body side structure has a closed cross section, which continues over a side sill and the front pillar, separated into a plurality of sections by a bulkhead. The bulkhead includes a rear end flange that joins to a sill top wall, a front end flange that joins to a pillar outer front wall, and a partition wall. The partition wall is formed into a cross-sectional U shape together with a sill outer side wall and a sill outer bottom wall, forming a third U-shaped cross section that leads to the pillar outer front wall. The third U-shaped cross section forms, together with an inner side sill, a closed cross section extension section that leads to the pillar outer front wall.

5 Claims, 9 Drawing Sheets

(51) Int. Cl.
*B62D 25/02* (2006.01)
*B62D 25/20* (2006.01)

(56) References Cited

U.S. PATENT DOCUMENTS

| | | | |
|---|---|---|---|
| 8,690,227 B2* | 4/2014 | Matsuoka et al. | 296/187.09 |
| 2009/0174220 A1* | 7/2009 | Guo | 296/187.12 |
| 2009/0278385 A1* | 11/2009 | Mendoza et al. | 296/187.12 |

FOREIGN PATENT DOCUMENTS

| | | |
|---|---|---|
| JP | 08-243770 | 9/1996 |
| JP | 2002-029455 | 1/2002 |
| JP | 2006-205901 | 8/2006 |
| JP | 2007-253786 | 10/2007 |

* cited by examiner

VEHICLE BODY SIDE STRUCTURE

TECHNICAL FIELD

The present invention relates to a vehicle body side part structure including a side sill extending positioned at a lower side of a side part of a vehicle body and extending longitudinally of the vehicle body, and a pillar extending upwardly from a front end of the side sill.

BACKGROUND ART

Certain known vehicle body side structure includes a side sill provided with a reinforcing member (rocker reinforcement member) that extends from a front end of the reinforcement member as far as a part of connection with the pillar reinforcement member (see Patent Literature 1, for example). In the thus-arranged vehicle body side structure, by virtue of the reinforcing member, increased rigidity is imparted to the connection part to thereby bear a side collision impact.

By thus causing the reinforcement member to extend from the front end of the side sill as far as the connection part with the pillar reinforcement, the front end of the reinforcement member can be disposed at the front end of the side sill. A front pillar is provided at the front end of the side sill in such a manner as to extend vertically therefrom. Thus, the front end of the reinforcing member can also be used as a bulkhead (partition wall) so that a lower end space of the front pillar can be partitioned or defined by the front end of the reinforcing member. In this arrangement, a load transmitted to a lower part of the front pillar from forward of the vehicle body can be transmitted to the side sill via the front end of the reinforcing member.

As a process for imparting rigidity to a vehicle body, it is known to provide a blank material at a position where rigidity is required, which process is called "Tailor Welded Blank" (hereinafter referred to as TWB) (see, for example, Patent Literature 2). The TWB enables provision of an outer panel in the form of an integral assembly by adding a blank material to a part where rigidity is required.

By adoption of the TWA, it becomes possible to remove from the side sill the reinforcing member shown in Patent Literature 1. However, if the reinforcing member is removed from the side sill, it becomes impossible to reinforce the lower part of the front pillar with the reinforcing member. Consequently, there remains a demand for a separate way to reinforce the lower part of the front pillar.

PRIOR ART LITERATURE

Patent Literature

Patent Literature 1: Japanese Patent Application Laid-Open Publication No. 2007-253786 A
Patent Literature 2: Japanese Patent Application Laid-Open Publication No. H08-243770 A

SUMMARY OF INVENTION

It is therefore an object of the present invention to provide a vehicle body side part structure wherein a pillar is reinforced at a lower part thereof to have required rigidity.

According to a first aspect of the present invention, there is provided a vehicle body side part structure which comprises: a side sill inner panel forming a vehicle-cabin inner surface of a side sill provided at a lower side part of a vehicle body and extending longitudinally of the vehicle body; a pillar inner panel forming a vehicle-cabin inner surface of a pillar extending upwardly from a front end of the side sill; an outer member connected to vehicle-cabin outer sides of the side sill inner panel and the pillar inner panel to thereby define a closed cross section continuing from the side sill up to the pillar; and a bulkhead partitioning the closed cross section into plurality, characterized in that the outer member comprises: a first U-shaped cross section formed into a U shape in cross section by a sill outer panel sidewall opposed to a vehicle width direction and by sill outer panel upper and lower walls extending from upper and lower ends of the sill outer panel sidewall centerward in the vehicle width direction, the first U-shaped cross section defining, jointly with the side sill inner panel, a side sill closed cross section; and a second closed cross section formed into a U shape in cross section by a pillar outer panel sidewall opposed to the vehicle width direction and by pillar outer panel front and rear walls extending from front and rear ends of the pillar outer panel sidewalls centerward in the vehicle width direction, the second U-shaped cross section defining, jointly with the pillar inner panel, a pillar closed cross section, the bulkhead comprises: a rear end flange connected to the sill outer panel upper wall; a front end flange connected to the pillar outer panel front wall; and a partition formed into a U shape in cross section by the sill outer panel side and lower walls, the partition defining a third U-shaped cross section, the third U-shaped cross section defines, jointly with the side sill inner panel, a closed cross section extension extending as far as the pillar outer panel front wall.

In a second aspect of the present invention, preferably, the side sill inner panel includes a fourth U-shaped cross section formed into a U shape in cross section by a sill inner panel sidewall opposed to the sill outer panel sidewall and by sill inner panel upper and lower walls extending from upper and lower ends of the sill inner panel sidewall outward in the vehicle width direction while the pillar inner panel includes a fifth U-shaped cross section formed into a U shape in cross section by a pillar inner panel sidewall opposed to the pillar outer panel sidewall and by pillar inner panel front and rear walls extending from front and rear ends of the pillar inner panel sidewall outward in the vehicle width direction. It is also preferred that the bulkhead include an inner flange connected to the sill inner panel upper wall and an outer flange connected to the sill outer panel sidewall and the closed cross section extension include the sill outer panel sidewall, the sill outer panel lower wall, the partition, and the side sill inner panel.

According to a third aspect of the present invention, desirably, the side sill inner panel includes a sill inner panel upper flange extending upwardly from a vehicle-width-direction outer end of the sill inner panel upper wall, and a sill inner panel lower flange extending downwardly from a vehicle-width-direction outer end of the sill inner panel lower wall, while the bulkhead is connected to the sill inner panel upper flange with the inner flange extending upward from a vehicle-width-direction inner end of the partition.

In a fourth aspect of the present invention, preferably, the pillar is reinforced by a pillar stiffener disposed at the pillar closed cross section, while the pillar stiffener includes a sixth U-shaped cross section formed into a U shape in cross section by a pillar stiffener sidewall connected to the pillar outer panel sidewall and by pillar stiffener front and rear walls extending from front and rear ends of the pillar stiffener sidewall outward in the vehicle-width-direction. It is also preferred that the bulkhead be arranged such that the rear end flange is connected to the sill outer panel upper wall through the pillar stiffener rear wall, the front end flange is connected to a pillar outer panel front wall through the pillar stiffener front wall, and the outer flange is connected to the sill outer panel sidewall through the pillar stiffener sidewall.

Advantageous Effects of Invention

In the first aspect of the present invention, the closed cross section is formed to extend from the side sill to the pillar and the closed cross section is partitioned into plurality by the bulkhead. By the partition of the bulkhead, the sill outer panel sidewall and the sill outer panel lower wall, the third U-shaped cross section is formed so as to extend as far as the pillar outer panel front wall. The closed cross section extension that extends to the pillar outer panel front wall is formed by the third U-shaped cross section and the side sill inner panel.

Since the third U-shaped cross section and the side sill inner panel are thus provided as a reinforcing arrangement of closed cross section, the intersection where the pillar lower end and the side sill front end meet is reinforced by the reinforcing arrangement. As a result, the intersection is imparted with required rigidity, thereby a collision load inputted into the vehicle body from forward thereof is transmitted efficiently to the side sill through the reinforcement of closed cross section.

By provision of the bulkhead, the reinforcement arrangement of closed cross section is provided. Consequently, even when a reinforcement is removed from the side sill as a result of adoption of TWB, required rigidity can be maintained at the intersection where the pillar lower end and the side sill front end meet.

In the second aspect, the side sill inner panel is provided with the sill inner panel upper wall to which the inner flange of the bulkhead is connected. By virtue of the simple arrangement wherein the sill inner panel upper wall is provided to the side sill inner panel while the inner flange is provided to the bulkhead, the bulkhead inner flange can be connected to the sill inner panel upper wall. This leads to the advantage that the closed cross section extension can be provided without making the bulkhead and the side sill inner panel complex in construction. As a result, readily assembling and forming operations of the bulkhead can be suitably maintained.

Further, bulkhead inner flange is connected to the sill inner panel upper wall while the bulkhead outer flange is connected to the sill outer panel sidewall. As a result, four sides, namely, the front end flange, the rear flange, the inner flange and the outer flange of the bulkhead are connected to define the closed cross section and inside the closed cross section is partitioned by the bulkhead. Consequently, sounds and vibration transmitted to the closed cross section can be insulated by the bulkhead, whereby the bulkhead make capable of functioning also as a separator, lessening the number of required parts.

In the third aspect, the bulkhead inner flange is arranged to extend upwardly from the partition and connected to the sill inner panel upper flange. As a result, the sill inner panel upper wall and the partition of the bulkhead can be disposed at the same height. This enables the partition to have the same height as the sill outer panel upper wall which is disposed at the same height as the sill inner panel upper wall. This further enables the side sill closed cross section and the closed cross section extension to substantially match with each other or to be aligned. Consequently, the collision load inputted into the vehicle body from frontward thereof can be transmitted more efficiently to the side sill through the reinforcing arrangement of closed cross section.

In the fourth aspect, the pillar stiffener is provided to the pillar closed cross section to reinforce the pillar. Further, through the pillar stiffener, the rear end flange, the front end flange and the outer flange of the bulkhead are connected respectively to the sill outer panel upper wall, the pillar outer panel front wall and the sill outer panel sidewall.

As a result, associated positions where the bulkhead is provided, namely, the sill outer panel upper wall, the pillar outer panel front wall, and the sill outer panel sidewall, are reinforced by the pillar stiffener. Reinforcing the pillar with the pillar stiffener and reinforcing with the pillar stiffener the associated positions where the bulkhead is disposed impart increased rigidity to the connection or intersection where the pillar and the side sill meet and are connected together.

MODE FOR CARRYING OUT INVENTION

Figure 1:
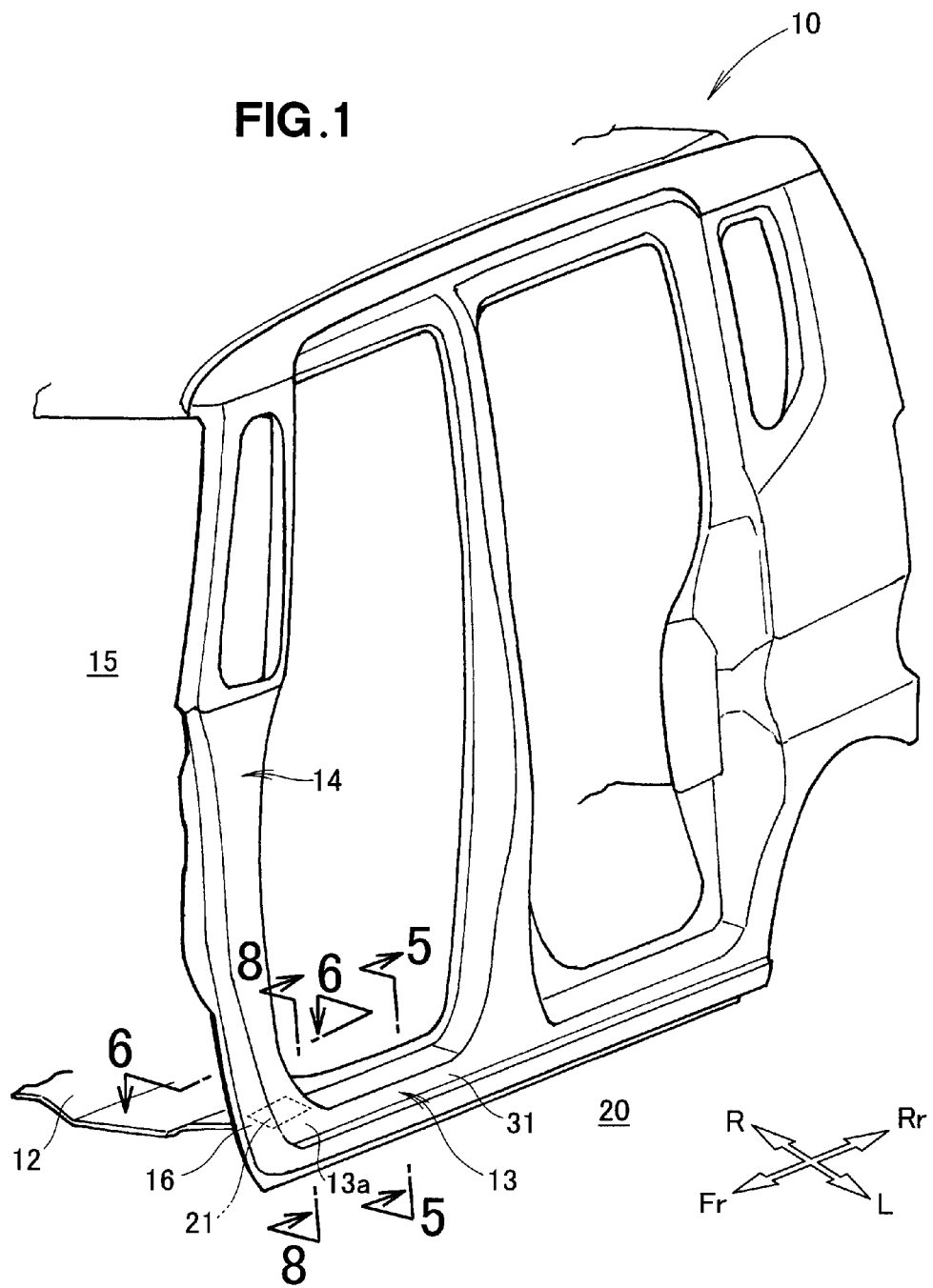
FIG. 1 is a perspective view illustrating a vehicle body side part structure according to the present invention.

A preferred embodiment of the present invention will be described in detail below with reference to the accompanying drawings. Reference characters "Fr" (Front), "Rr" (Rear), "L" (Left) and "R" (Right) appearing in the drawings represent arrowed directions as seen from a driver.

Embodiment

Figure 2:
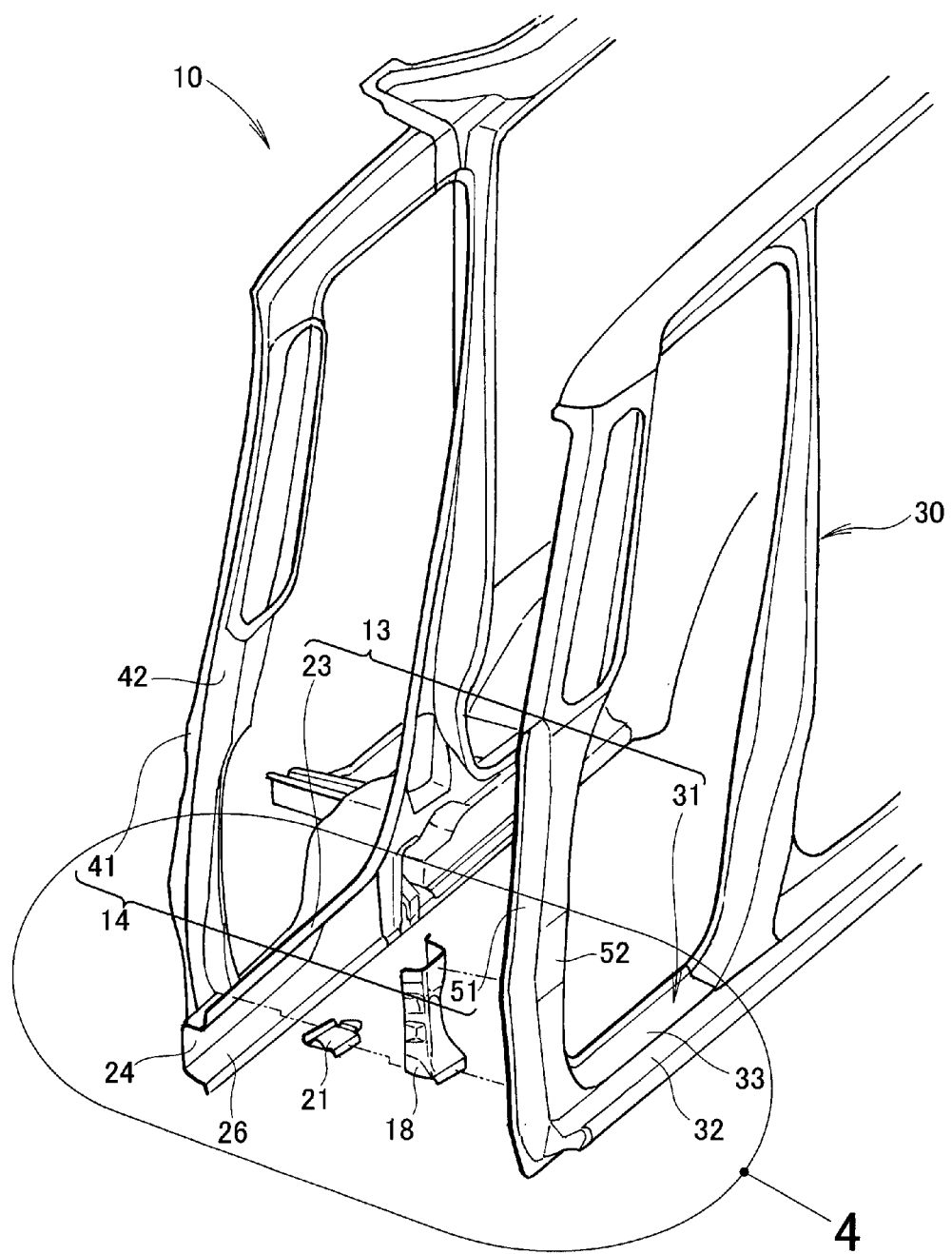
FIG. 2 is an exploded perspective view showing the vehicle body side part structure of FIG. 1.

As shown in FIGS. 1 and 2, a vehicle body side part structure 10 includes a floor pane 12 forming a vehicle floor, a side sill 13 extending longitudinally of a vehicle body (not shown) along an outer side part of the latter, and a front pillar 14 rising from a front end 13a of the side will. The vehicle body side part structure 10 also includes a pillar stiffener 18 provided internally of the front pillar 14 and a bulkhead 21 provided at a boundary or border 16 between the front pillar 14 and the side sill 13.

Figure 5:
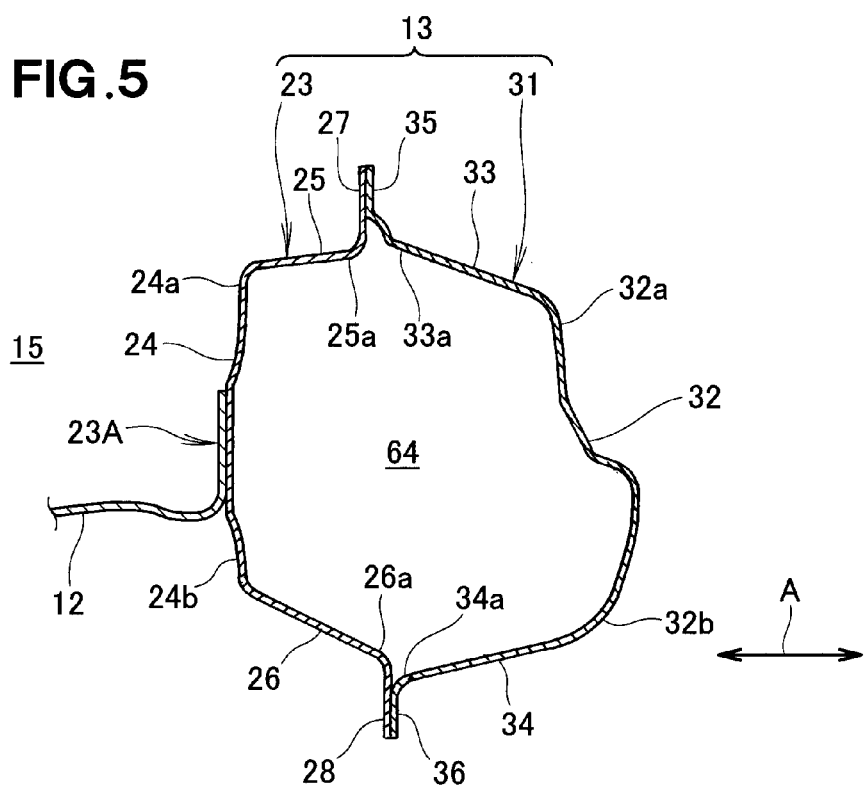
FIG. 5 is an enlarged cross-sectional view taken along line 5-5 of FIG. 1.

The side sill 13 comprises a member of rectangular closed cross section positioned at a lower part of the vehicle body and extending in a front-to-end direction (see FIG. 5). The side sill 13 is comprised of a side sill inner panel 23 forming an outside-cabin side surface (inner side surface of a vehicle cabin 15) of the side sill 13, and a first U-shaped cross section (side sill outer panel) 31 joined to an outside-cabin side of the side sill inner panel 23.

Figure 6:
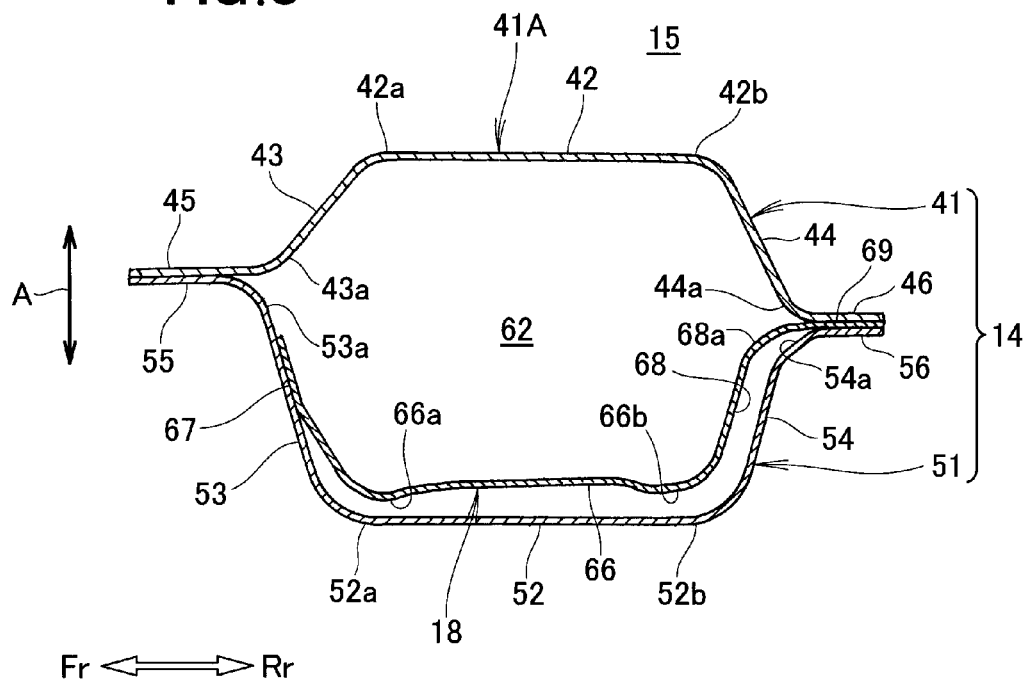
FIG. 6 is an enlarged cross-sectional view taken along line 6-6 of FIG. 1.

The front pillar 14 is comprised of a member extending upwardly from the front end 13a of the side sill 13 and having a substantially rectangular closed cross section (see FIG. 6. The front pillar 14 also includes a pillar inner panel 41 forming an inner side surface thereof which is on a side of the cabin 15, and a second U-shaped cross-sectional part (pillar outer panel) 51 joined to an outside-cabin side of the pillar inner panel 41.

The side sill outer panel 31 and the pillar outer panel 51 are included in an outer member 30. The outer member 30 takes the form of a panel forming an outside-cabin side part of the vehicle body side part structure 10. The side sill outer panel 31 of the outer member 30 is joined to an outside-cabin side of the side sill inner panel 23. The pillar outer panel 51 of the outer member 30 is joined to an outside-cabin side of the pillar inner panel 41.

Figure 3:
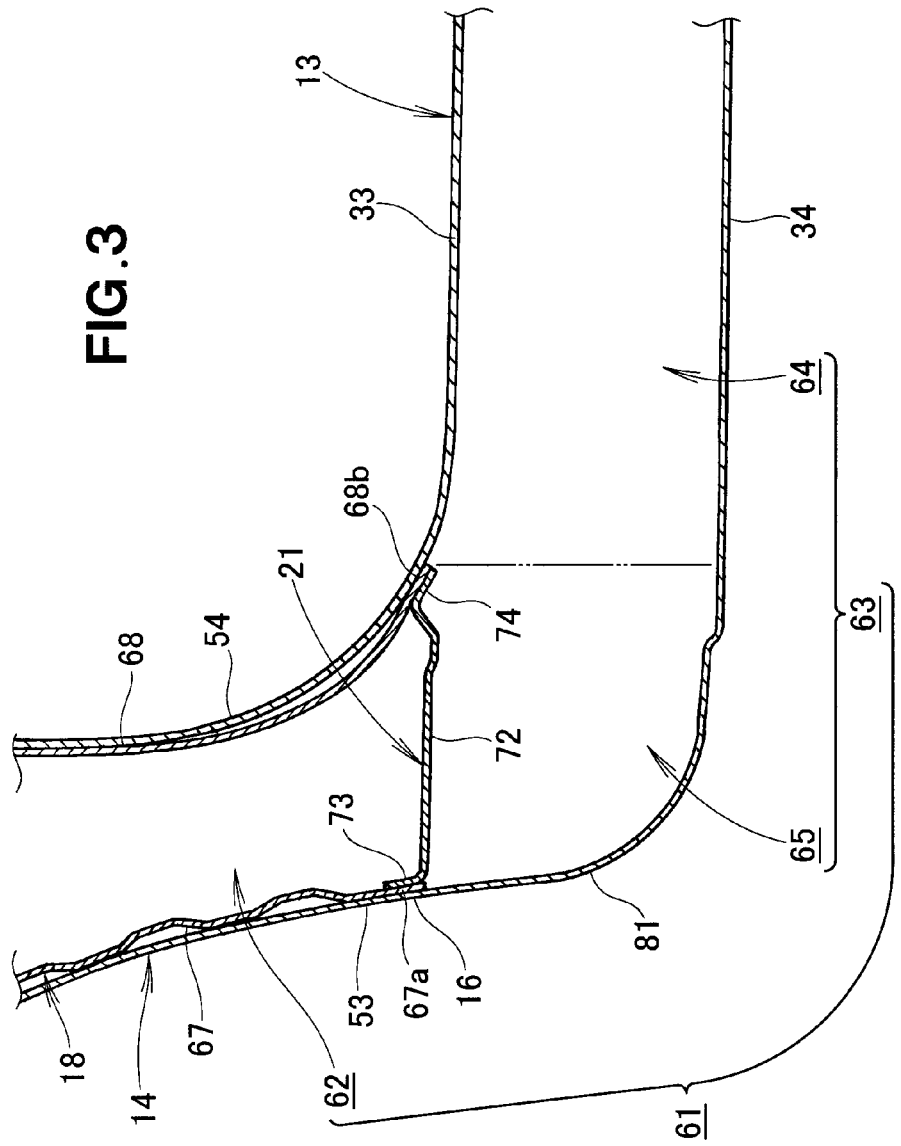
FIG. 3 is a cross-sectional view illustrating a closed cross section of the vehicle body side part structure of FIG. 2.

As shown in FIG. 3, the inside of the side sill 13 and the inside of the front pillar 14 communicates with each other if the bulkhead 21 is omitted. Thus, with the bulkhead 21 omitted, the side sill 13 and the front pillar 14 jointly define a closed cross-section 61 spanning between the two members 13 and 14.

As shown in FIGS. 2 and 3, the side sill outer panel 31 is joined to the outside-cabin side of the side sill inner panel 23 to form the side will 13, thereby defining a side will closed cross section 64 within the side sill 13. The pillar outer panel 51 is joined to the outside-cabin side of the pillar inner panel 41 to form the front pillar 14, thereby defining a pillar closed cross section 62.

Figure 4:
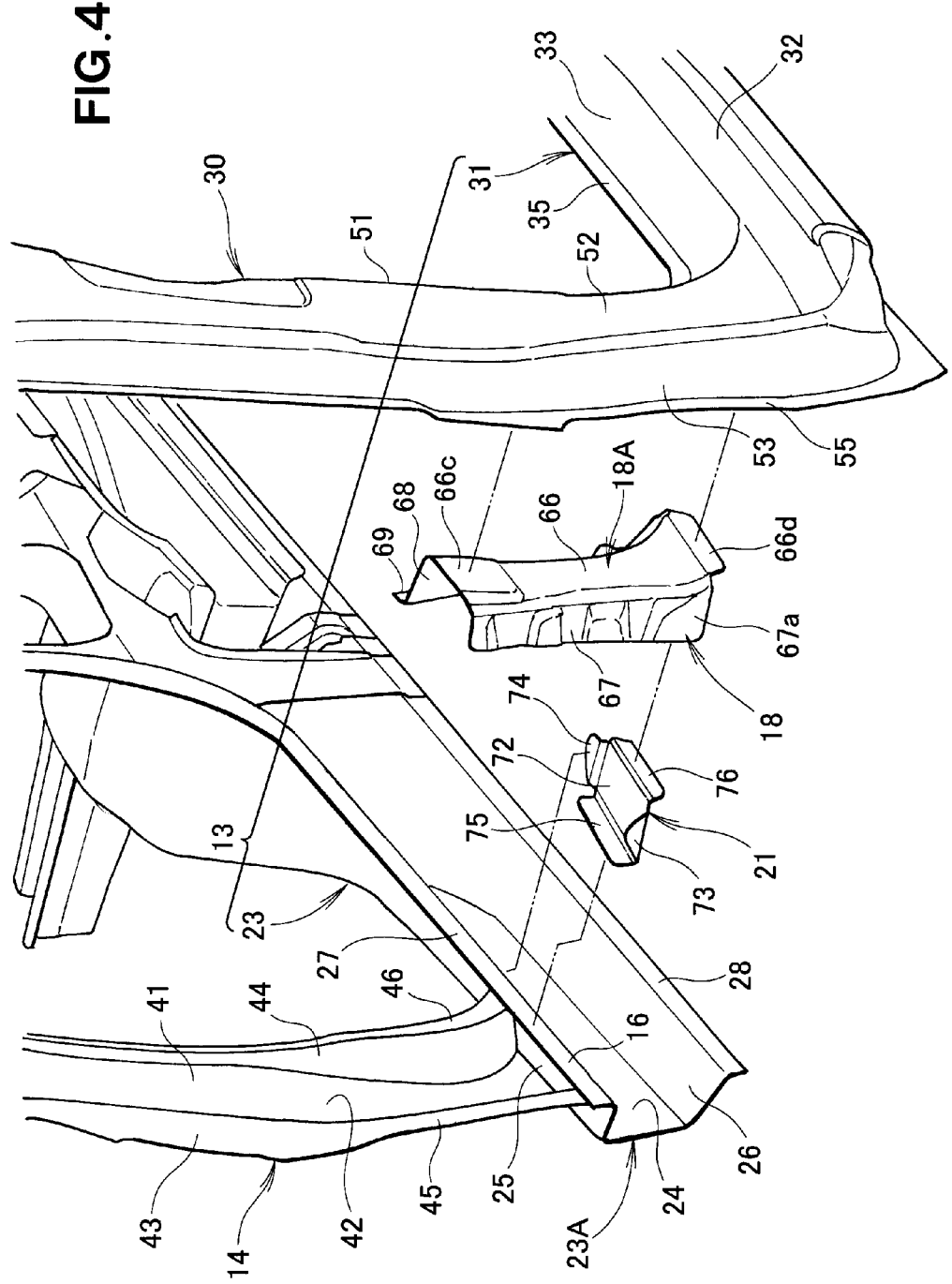
FIG. 4 is an enlarged cross-sectional view illustrating region 4 of FIG. 2.

As shown in FIGS. 4 and 5, the side sill inner panel 23 is comprised of a sill inner panel side wall 24 opposed to a sill outer panel sidewall 32, a sill inner panel upper wall 25 extending from an upper end 24a of the sill inner panel side wall 24 outwardly in a vehicle width direction, and a sill inner panel lower wall 26 extending from a lower end 24b of the sill inner panel sidewall 24 outwardly in the vehicle width direction.

The side sill inner panel 23 further includes a sill inner panel upper flange 27 extending upwardly from a vehicle-width-direction outer end 25a of the sill inner panel upper wall 25, and a sill inner panel lower flange 28 extending downwardly from the vehicle-width-direction outer end 26a of the sill inner panel lower wall 26.

The side sill inner panel 23 includes a fourth U-shaped cross section 23A formed into a U-shaped cross section by the sill inner pane sidewall 24, the sill inner panel upper wall 25 and the sill inner panel lower wall 26.

The first U-shaped cross section 31 defines a side sill closed section 64 jointly with the side sill inner panel 23. The first U-shaped cross section 31 is comprised of a sill outer panel sidewall 32 extending in a direction opposed to a vehicle width direction (direction of arrow A), a sill outer panel upper wall 32 extending from an upper end 32a of the sill outer panel sidewall 32 centerward in the vehicle width direction, and a sill outer panel lower wall 34 extending from a lower end 32b of the sill outer panel sidewall 32 centerward in the vehicle width direction.

The first U-shaped cross section 31 also includes a sill outer panel upper flange 35 extending upwardly from a vehicle-width-direction inner end 33a of the sill outer panel upper wall 33 and a sill outer panel lower flange 36 extending downwardly from a vehicle-width-direction inner end 34a of the sill outer panel lower wall 34.

The sill outer panel sidewall 32, the sill outer panel upper wall 33 and the sill outer panel lower wall 34 jointly form the U-shaped cross section.

The sill inner panel upper flange 27 and the sill outer panel flange 35 are joined together while the sill inner panel lower flange 28 and the sill outer panel lower flange 36 are joined together, whereby the side will inner panel 23 and the first U-shaped cross section 31 are joined together. With the side will inner panel 23 and the first U-shaped cross section 31 joined together, the side sill 13 is formed into a rectangular closed cross section. Formed within the side sill 13 is the side sill closed cross section 64.

As shown in FIGS. 4 and 6, the pillar inner panel 41 of the front pillar 14 is comprised of a pillar inner panel 42 disposed in opposed relation to a pillar outer sidewall 52, a pillar inner front wall 43 extending from front end 42a of the pillar inner sidewall 42 outwardly of the vehicle width direction (direction of arrow A), and a pillar inner rear wall 44 extending from a rear end 42b of the pillar inner sidewall 42 outwardly of the vehicle width direction.

The pillar inner panel 41 also includes a pillar inner front flange 45 extending from an inner end 43a of the pillar inner front wall 43 forwardly of a vehicle body, and a pillar inner rear flange 46 extending from an inner end 44a of the pillar inner rear wall 44 rearwardly of the vehicle body.

The pillar inner panel 41 pillar inner sidewall 44, the pillar inner front wall 43 and the pillar inner rear wall 44 jointly form a fifth U-shaped cross section 41A of U-shaped cross section.

Jointly with the pillar inner panel 41, the second U-shaped cross section 51 defines a pillar closed cross section 62. The second U-shaped cross section 51 includes a pillar outer sidewall 52 opposed to the vehicle width direction (arrow A), a pillar outer front wall 53 extending from a front end 52a of the pillar outer sidewall 52 centerward in the vehicle width direction, and a pillar outer rear wall 54 extending from a rear end 52a of the pillar outer sidewall 52 centerward in the vehicle width direction.

The second U-shaped cross section also includes a pillar outer front flange 55 extending from an inner end 53a of the pillar outer front wall 53 forwardly of the vehicle body, and a pillar outer rear flange 56 extending from an inner end 54a of the pillar outer rear wall 54 rearwardly of the vehicle body.

The second U-shaped cross section 51 is formed into a U configuration jointly by the pillar outer sidewall 52, the pillar outer front wall 53 and the pillar outer rear wall 54.

The pillar inner front flange 45 and the pillar outer front flange 55 are joined together while the pillar inner rear flange 46 and the pillar outer rear flange 56 are joined together, whereby the pillar inner panel 41 and the second U-shaped cross section 51 are joined together. With the pillar inner panel 41 and the second U-shaped cross section joined together, the pillar inner panel 41 is formed into a substantially rectangular closed cross section. Defined inside the pillar inner panel 41 is the pillar closed cross section 62.

Disposed within the front pillar 14, namely, the pillar closed cross section 62, is the pillar stiffener 18. The pillar stiffener 18 is comprised of a pillar stiffener sidewall 66 extending along the pillar outer sidewall 52, a pillar stiffener front wall 67 extending from a front end 66a of the pillar stiffener sidewall 66 outward in the vehicle width direction, a pillar stiffener rear wall 68 extending from a rear end 66b of the pillar stiffener sidewall 66 outward in the vehicle width direction, and a pillar stiffener flange 69 extending from an inner end 68a of the pillar stiffener rear wall 68 rearwardly of the vehicle body.

The pillar stiffener 18 includes a sixth U-shaped closed cross section 18A defined by the pillar stiffener sidewall 66, the pillar stiffener front wall 67 and the pillar stiffener rear wall 68.

The pillar stiffener sidewall 66 has an upper end 66c and a lower or bottom end 66d, which are connected to the pillar outer sidewall 52. The pillar stiffener front wall 67 is connected to the pillar outer front wall 53. The pillar stiffener flange 69 is connected to the pillar inner rear flange 46 and the pillar outer rear flange 56 in a sandwiched manner therebetween. The pillar stiffener 18 is thus positioned within the second U-shaped cross section 51 in such a manner as to extend along the second U-shaped cross section 51.

Figure 7:
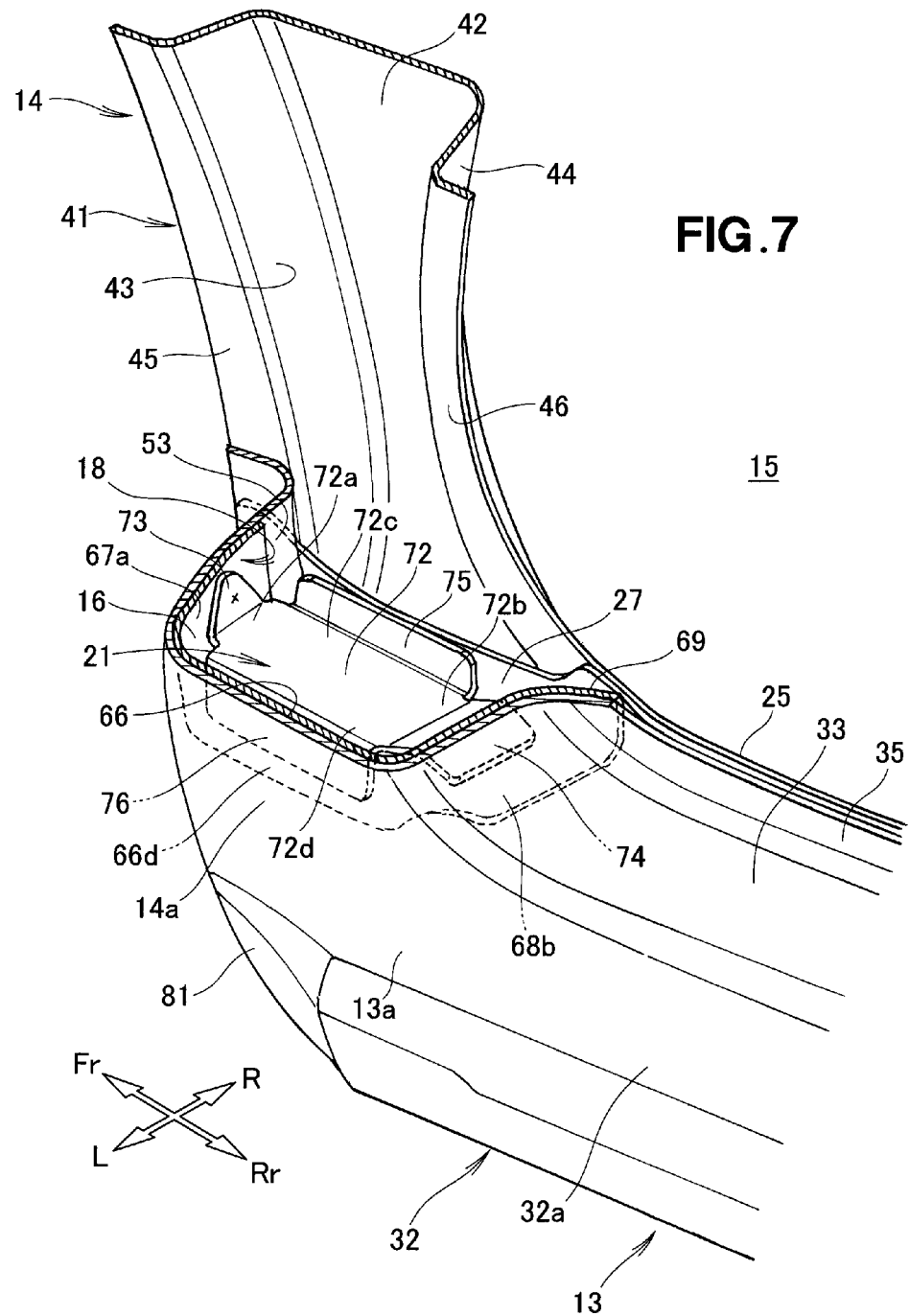
FIG. 7 is a perspective view illustrating a bulkhead shown in FIG. 4.

As shown in FIGS. 3 and 7, the bulkhead 21 is provided at the boundary 16 between a lower or bottom end 14a of the front pillar 14 and a front end 13a of the side sill 13. As a result of being provided at the boundary 16, the bulkhead 21 functions as a partition member that divides the closed cross section 61 into the pillar closed cross section (upper side closed cross section) 62 and the lower side closed cross section 63.

The bulkhead includes a partition 72 that divides the closed cross section 61 into plural, a front end flange 73 provided at a front end 72a of the partition 72, a rear end flange 74 provided at a rear end 72b of the partition 72, an inner flange 75 provided at an inner end (vehicle width direction inner side end) 72c of the partition 72, and an outer flange 76 provided at an outer end 72d of the partition 72.

The front end flange 73 extends upwardly from the front end 72a of the partition 72. The front end flange 73 is connected to the pillar outer front wall 53 through a lower end 67a of the pillar stiffener front wall 67 (see FIG. 4). The rear end flange 74 extends from the rear end 72b of the partition 72 rearwardly of the vehicle body in a dog-legged fashion. The rear end flange 74 is connected to the sill outer panel upper wall 33 through a lower or bottom end 68b of the pillar stiffener rear wall 68.

The inner flange 75 extends upwardly from the inner end 72c of the partition 72. The inner flange 75 is connected to the sill inner panel upper flange 27, namely, the sill inner panel upper wall 25 (see FIG. 5). The outer flange 76 extends downwardly from an outer end 72d of the partition 72. The outer flange 76 is connected to the sill outer panel sidewall 32 through the bottom end 66d of the pillar stiffener sidewall 66.

Front end flange 73, rear end flange 74, inner end flange 75, and outer end flange 76 of the bulkhead 21 are thus connected to the side will 13 and the front pillar 14. The partition 72, namely, the bulkhead 21, is provided at the boundary 16 between the front end 13a of the side sill 13 and the lower end 14a of the front pillar 14. By the bulkhead 21, the closed cross section 61 is partitioned into the pillar closed cross section (upper side closed cross section) 62 and the lower side closed cross section 63.

Figure 8:
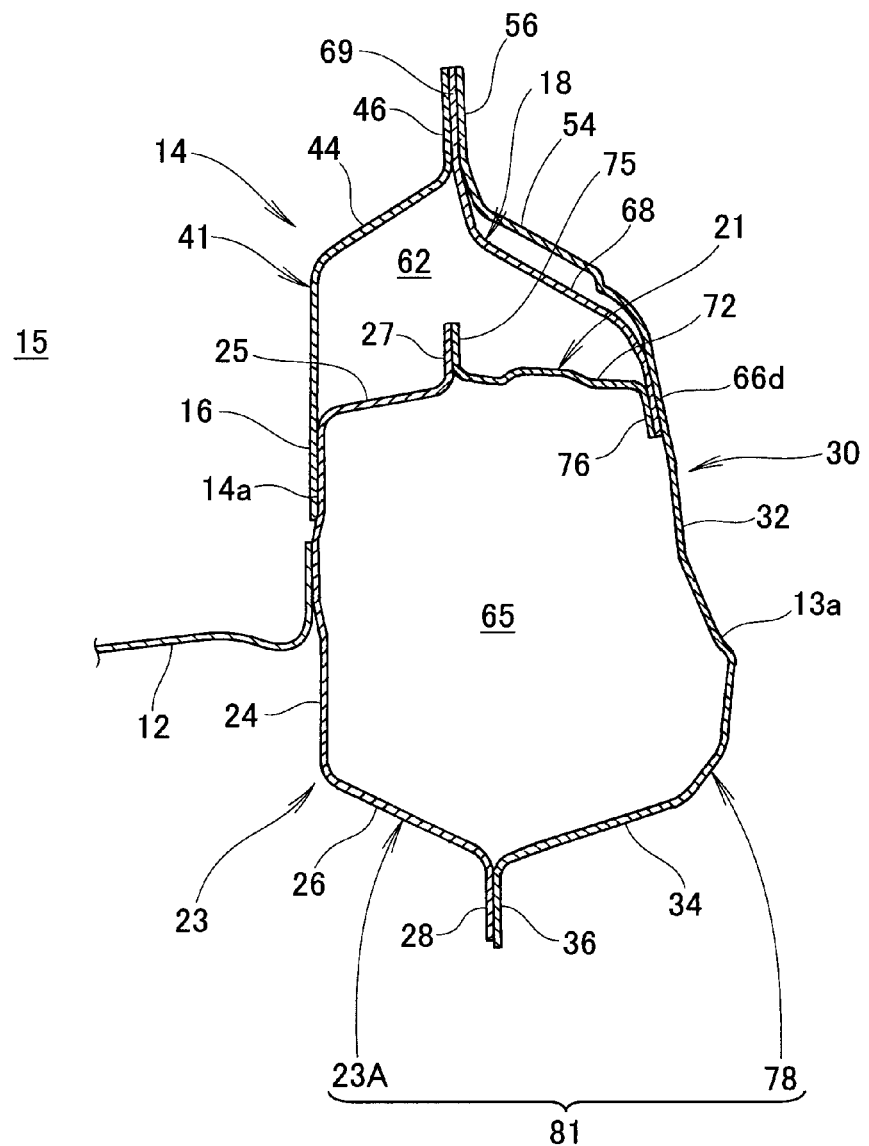
FIG. 8 is a cross-sectional view taken along line 8-8 of FIG. 1.

As shown in FIGS. 7 and 8, with the partition 72 provided at the border 16 between the front end 13a of the side sill 13 and the lower end 14a of the front pillar 14, a third U-shaped cross section 78 is formed jointly by the partition 72, the sill outer panel sidewall 32 and the sill outer panel lower wall 34.

The sill inner panel upper flange 27 and the inner flange 75 are joined together while the sill inner panel lower flange 28 and the sill outer panel lower flange 36 are joined together, with the result that the third U-shaped cross section 78 and the third U-shaped cross section 23A of the side sill inner panel 23 are joined together. The third U-shaped cross section 78 and the fourth U-shaped cross section 23A are joined together such that they jointly define a substantially rectangular closed cross section. That is, the third U-shaped cross section 78 and the fourth U-shaped cross section 23A jointly form a substantially rectangular reinforcement 81 of closed cross section. A closed cross section extension 65 is defined within the closed cross-section reinforcement 81.

The closed cross section extension 65 is defined jointly by the sill outer panel sidewall 32, the sill outer panel lower wall 34, the partition 72, and the fourth U-shaped cross section 23A. The closed cross section extension 65 is formed to extend from the side will closed cross section 64 as far as the pillar outer panel front wall 53 (see FIG. 3).

The closed cross section reinforcement 81 is provided at a position where a lower end 14a of the front pillar 14 and a front end 13a of the side sill 13 intersect. That is, the part where the lower end 14a of the front pillar 14 and front end 13a of the side sill 13 intersect is reinforced with the closed cross section reinforcement 81. As a result, a collision load inputted into the vehicle body from a front part thereof is efficiently transmitted to the side sill 13 through the closed cross section reinforcement.

As can be appreciated from above, the closed cross section reinforcement 81 is formed by provision of the bulkhead 21. Thus, even when a reinforcing member is removed from the side sill as a result of adoption of the TWB, the portion where the lower end 14a of the front pillar 14 and the front end 13a of the side sill 13 meet is reinforced with the reinforcement 81 and maintains required rigidity.

In addition, the bulkhead 21 has an inner flange 75 rising from an inner end 72c of the partition 72 and connected to the sill inner panel upper flange 27 of the side sill inner panel 23. In this manner, with the simple arrangement wherein the side sill inner panel 23 is provided with the sill inner panel upper flange 27 and the bulkhead 21 is provided with the inner flange 75, the inner flange 75 of the bulkhead 21 can be connected to the sill inner panel upper flange 27 with ease. Consequently, the closed cross section extension 65 can be formed easily without making the bulkhead 21 and the side sill inner panel 23 complex in configuration.

As explained above, by simply forming the closed cross section extension 62 with the third U-shaped cross section 78 and the side sill inner panel 23, it becomes possible to form the closed cross section reinforcement 81 utilizing the third U-shaped cross section 78 and the side sill inner panel 23. Consequently, it becomes possible for the closed cross section reinforcement 81 to suitably maintain its easy assemblage and forming operations.

The front end flange 73 of the bulkhead 21 is connected to the pillar outer panel front wall 53 through the lower end 67a of the pillar stiffener front wall 67 (see FIG. 4), while the rear end flange 74 of the bulkhead 21 is connected to the sill outer panel upper wall 33 through the bottom end 68b of the pillar stiffener rear wall 68. In addition, the inner flange 75 of the bulkhead 21 is connected to the sill inner panel upper flange 27 while the outer flange 76 of the bulkhead 21 is connected to the sill outer panel sidewall 32 through a lower end 66d of the pillar stiffener sidewall 66.

Turning back to FIG. 3, the bulkhead 21 divides the closed cross section 61 into the pillar closed cross section (upper side closed cross section) 62 and the lower closed cross section 63. This arrangement makes it possible, for example, to prevent sounds and vibrations from being transmitted from the lower side closed cross section 63 to the pillar closed cross section 62. That is, by partitioning the closed cross section 61 with the bulkhead 21, it becomes possible to insulate, with the bulkhead 21, sounds and vibrations being transmitted through the closed cross section 61, thus making the bulkhead 21 dually function in addition to being a separator. Consequently, it becomes unnecessary to provide an additional separator, thus enabling reduction in the number of required parts.

Referring again to FIG. 8, the inner flange 75 of the bulkhead 21 extends upwardly from the partition 72 and is connected to the sill inner panel upper flange 27. Thus, it becomes possible for the sill inner panel upper wall 25 and the partition 72 of the bulkhead to have the same height. As shown in FIG. 5, the sill inner panel upper wall 25 is set to have the same height as the sill outer panel upper wall 33.

As shown in FIGS. 3 and 7, the partition 72 is set to have the same height as the sill outer panel upper wall 33. As a result, it becomes possible for the side sill closed cross section 64 and the closed cross section extension 65 to substantially match. By thus causing the closed cross section 64 and the extension 65 to substantially match with each other, they can be arranged linearly in a vehicle length direction with the side sill 13 and the closed cross section reinforcement 81 substantially matched with each other. As a result, a collision load inputted into the vehicle body from frontward can be transmitted more efficiently to the side sill 13 through the closed cross section reinforcement 81.

Provision of the pillar stiffener 18 to the pillar closed cross section 62, as shown in FIGS. 4, 6 and 7, the front pillar 14 can be reinforce with the pillar stiffener 18. Further, the front flange 73, rear flange 74 and the outer flange 76 of the bulkhead 21 are connected via the pillar stiffener 18 to the pillar outer panel front wall 53, the sill outer panel upper wall 33 and the sill outer panel sidewall 32, respectively. Thus, the positions (pillar outer panel front wall 53, the sill outer panel upper wall 33 and the sill outer panel sidewall 32) where the bulkhead 21 is provided are reinforced by the pillar stiffener 18.

By thus reinforcing with the pillar stiffener 18 the front pillar 14 and the portions where the bulkhead 21 is provided, it becomes possible to impart increased rigidity to the portion where the lower end 14a of the front pillar 14 and the front end 13a of the side sill 13 intersect.

Figure 9:
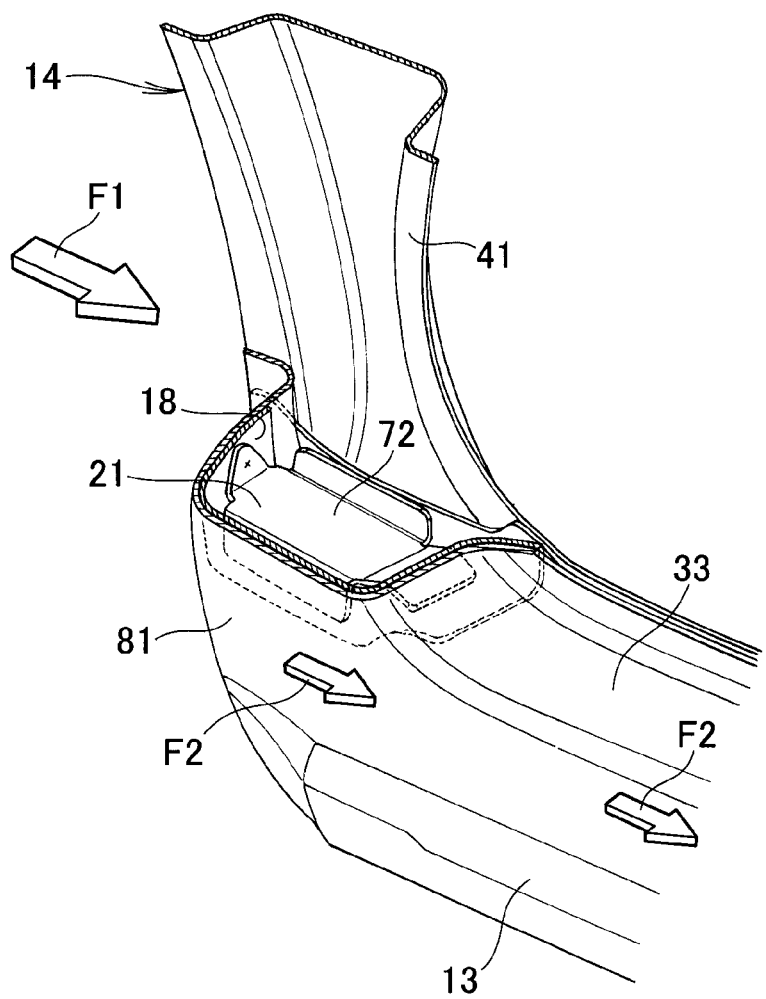
FIG. 9 is a view illustrating, as an example, a load from a vehicle front collision inputting into a front pillar.

Referring now to FIG. 9, discussion will be made next as to an example input mode of a collision load from vehicle frontward of. As shown in FIG. 9, a collision load F1 inputs into the vehicle body from frontward thereof. The input collision load F1 is transmitted through the front pillar 14 to the closed cross section reinforcement 81 as load F2.

As explained above, the closed cross section reinforcement 81 is formed into a substantially rectangular closed cross section and is positioned so as to be aligned with the side will 13 in the vehicle length direction. Consequently, the inputted collision load F1 can be transmitted through the closed cross section reinforcement 81 to the side sill 13 with increased efficiency.

The vehicle body side part structure according to the present invention should not be construed as being limited to those explained above in that alterations and improvements are possible. For example, in the described embodiment, although the pillar has been referred to as the front pillar 14, the invention may also be applied to a center pillar, a rear pillar and other like pillars.

It should also be noted that the described configurations and arrangements of the vehicle body side part structure 10, side sill 13, front pillar 14, pillar stiffener 18, sixth U-shaped cross section 18A, bulkhead 21, side sill inner panel 23, fourth U-shaped cross section 23A, outer member 30, first U-shaped cross section 31, pillar inner panel 41, fifth U-shaped cross section 41A, second U-shaped cross section 51, closed cross section 61, pillar closed cross section 62, side sill closed cross section 64, closed cross section extension 65, and third U-shaped cross section 78 are merely exemplary and changes and alterations thereof are possible.

INDUSTRIAL APPLICABILITY

The present invention is particularly suitable for use on an automobile including a vehicle body side part structure which is comprised of a side sill positioned at a lower side part of the vehicle body and extending in a length direction of the vehicle body, and a pillar extending upwardly from a front end of the side sill.

REFERENCE SIGNS LIST

10 ... vehicle body side part structure; 13 ... side sill; 13a ... front end of side sill; 14 ... front pillar; 15 ... vehicle cabin; 18 ... pillar stiffener; 18A ... sixth U-shaped cross section; 21 ... bulkhead; 23 ... side sill inner panel; 23A ... fourth U-shaped cross section; 24 ... sill inner panel sidewall; 24a ... upper end of sill inner panel sidewall; 24b ... lower end of sill inner panel sidewall; 25 ... sill inner panel upper wall; 25a ... vehicle width direction outer end of sill inner panel upper wall; 26 ... sill inner panel lower wall; 26a ... vehicle width direction outer end of sill inner panel lower wall; 27 ... sill inner panel upper flange; 28 ... sill inner panel lower flange: 30 ... outer member; 31 ... first U-shaped cross section; 32 ... sill outer panel sidewall; 32a ... upper end of sill outer panel sidewall; 32b ... lower end of sill outer panel sidewall; 33 ... sill outer panel upper wall; 34 ... sill outer panel lower wall; 41 ... pillar inner panel; 41A ... fifth U-shaped cross section; 42 ... pillar inner panel sidewall; 42a ... front end of pillar inner panel sidewall; 42b ... rear end of pillar inner panel sidewall; 43 ... pillar inner panel front wall; 44 ... pillar inner panel rear wall; 51 ... second U-shaped cross section; 52 ... pillar outer panel sidewall; 52a ... front end of pillar outer panel sidewall; 52b ... rear end of pillar outer panel sidewall 53 ... pillar outer panel front wall; 54 ... pillar outer panel rear wall; 61 ... closed cross section; 62 ... pillar closed cross section; 64 ... side sill closed cross section; 65 ... closed cross section extension; 66 ... pillar stiffener sidewall; 66a ... front end of pillar stiffener sidewall; 66b ... rear end of pillar stiffener sidewall; 67 ... pillar stiffener front end; 68 ... pillar stiffener rear end; 72 ... partition; 72a ... front end of partition; 72b ... rear end of partition; 72c ... (vehicle width direction) inner end of partition; 72d ... outer end of partition; 73 ... front end flange; 74 ... rear end flange; 75 ... inner flange; 76 ... outer flange; 78 ... third U-shaped cross section

The invention claimed is:

1. A vehicle body side part structure comprising:
a side sill inner panel forming a vehicle-cabin inner surface of a side sill provided at a lower side part of a vehicle body and extending longitudinally of the vehicle body;
a pillar inner panel forming a vehicle-cabin inner surface of a pillar extending upwardly from a front end of the side sill;
an outer member connected to vehicle-cabin outer sides of the side sill inner panel and the pillar inner panel to thereby define a closed cross section continuing from the side sill up to the pillar; and
a bulkhead partitioning the closed cross section into plurality,
wherein the outer member comprises:
a first U-shaped cross section formed into a U shape in cross section by a sill outer panel sidewall opposed to a vehicle width direction and by sill outer panel upper and lower walls extending from upper and lower ends of the sill outer panel sidewall centerward in the vehicle width direction, the first U-shaped cross section defining, jointly with the side sill inner panel, a side sill closed cross section; and
a second closed cross section formed into a U shape in cross section by a pillar outer panel sidewall opposed to the vehicle width direction and by pillar outer panel front and rear walls extending from front and rear ends of the pillar outer panel sidewalls centerward in the vehicle width direction, the second U-shaped cross section defining, jointly with the pillar inner panel, a pillar closed cross section, the bulkhead comprises:

a rear end flange connected to the sill outer panel upper wall;

a front end flange connected to the pillar outer panel front wall; and a partition formed into a U shape in cross section by the sill outer panel side and lower walls, the partition defining a third U-shaped cross section, the third U-shaped cross section defines, jointly with the side sill inner panel, a closed cross section extension extending as far as the pillar outer panel front wall.

2. The vehicle body side part structure of claim 1, wherein the side sill inner panel includes a fourth U-shaped cross section formed into a U shape in cross section by a sill inner panel sidewall opposed to the sill outer panel sidewall and by sill inner panel upper and lower walls extending from upper and lower ends of the sill inner panel sidewall outward in the vehicle width direction, the pillar inner panel includes a fifth U-shaped cross section formed into a U shape in cross section by a pillar inner panel sidewall opposed to the pillar outer panel sidewall and by pillar inner panel front and rear walls extending from front and rear ends of the pillar inner panel sidewall outward in the vehicle width direction, the bulkhead includes an inner flange connected to the sill inner panel upper wall and an outer flange connected to the sill outer panel sidewall, and the closed cross section extension includes the sill outer panel sidewall, the sill outer panel lower wall, the partition, and the side sill inner panel.

3. The vehicle body side part structure of claim 2, wherein the side sill inner panel includes a sill inner panel upper flange extending upwardly from a vehicle-width-direction outer end of the sill inner panel upper wall, and a sill inner panel lower flange extending downwardly from a vehicle-width-direction outer end of the sill inner panel lower wall, and the bulkhead is connected to the sill inner panel upper flange with the inner flange extending upward from a vehicle-width-direction inner end of the partition.

4. The vehicle body side part structure of claim 2, wherein the pillar is reinforced by a pillar stiffener disposed at the pillar closed cross section, the pillar stiffener includes a sixth U-shaped cross section formed into a U shape in cross section by a pillar stiffener sidewall connected to the pillar outer panel sidewall and by pillar stiffener front and rear walls extending from front and rear ends of the pillar stiffener sidewall outward in the vehicle-width-direction, and the bulkhead is arranged such that the rear end flange is connected to the sill outer panel upper wall through the pillar stiffener rear wall, the front end flange is connected to a pillar outer panel front wall through the pillar stiffener front wall, and the outer flange is connected to the sill outer panel sidewall through the pillar stiffener sidewall.

5. The vehicle body side part structure of claim 2, wherein the pillar is reinforced by a pillar stiffener disposed at the pillar closed cross section, the pillar stiffener includes a sixth U-shaped cross section formed into a U shape in cross section by a pillar stiffener sidewall connected to the pillar outer panel sidewall and by pillar stiffener front and rear walls extending from front and rear ends of the pillar stiffener sidewall outward in the vehicle-width-direction, and the bulkhead is arranged such that the rear end flange is connected to the sill outer panel upper wall through the pillar stiffener rear wall, the front end flange is connected to a pillar outer panel front wall through the pillar stiffener front wall, and the outer flange is connected to the sill outer panel sidewall through the pillar stiffener sidewall.

* * * * *